Patented Feb. 10, 1931

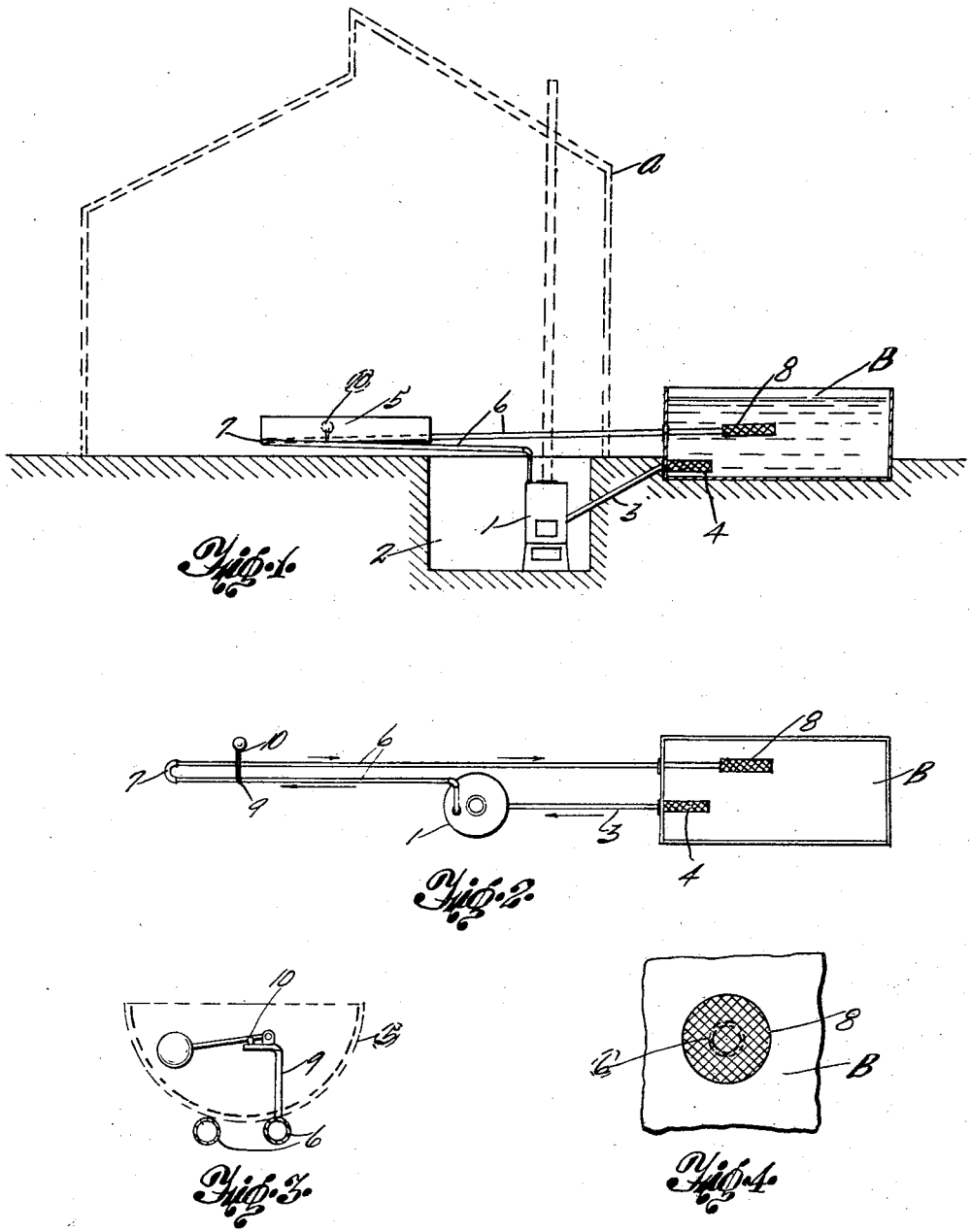

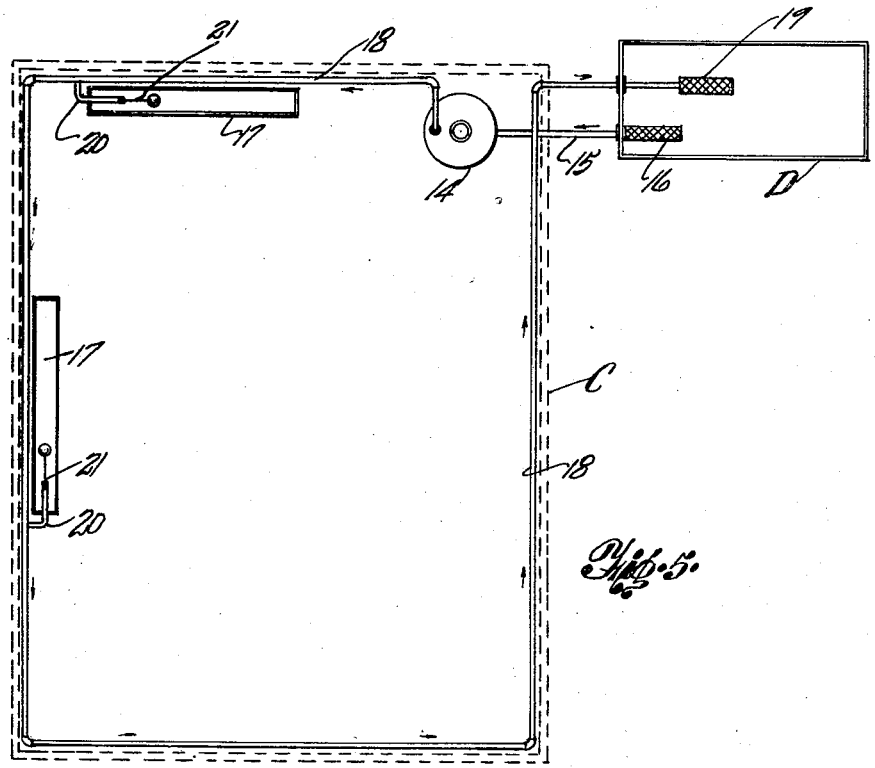
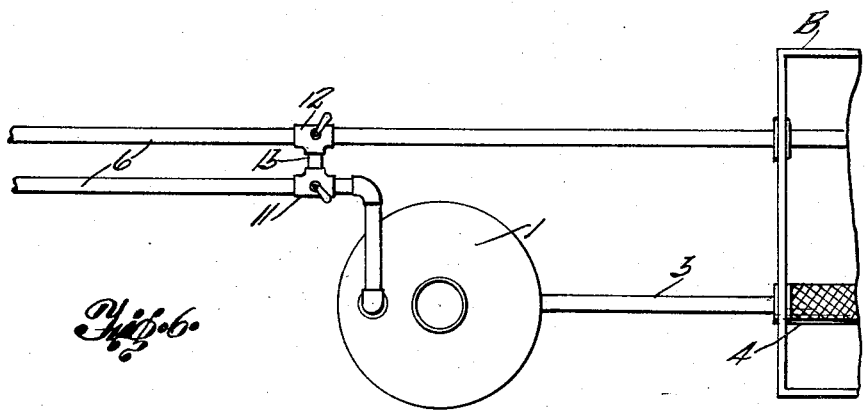

1,792,199

UNITED STATES PATENT OFFICE

DE WITT E. TALLYN, OF BENSON, ILLINOIS

WATER CIRCULATING AND HEATING SYSTEM FOR STOCK-WATERING TANKS AND TROUGHS

Application filed April 14, 1930. Serial No. 444,160.

This invention is a water circulating and heating system for stock watering tanks and troughs.

The main object of the invention is to provide a means for heating the drinking water for stock during the winter, for circulating the water through the troughs and for maintaining the water in the troughs at a constant level.

Another object is to provide a simple and efficient means for accomplishing the above operations.

The foregoing and other objects together with means whereby the same may be carried into effect will best be understood from the following description of several preferred embodiments of the invention taken in connection with the accompanying drawings wherein:

Figure 1 is a side view of the invention as installed in a hog house and adjacent thereto, said hog house being shown in dotted lines.

Figure 2 is a detached plan view of the construction shown in Figure 1.

Figure 3 is a detail view of the automatic trough filling valve, the trough being shown in dotted lines.

Figure 4 is a detail end view of one of the water strainers in the supply tank.

Figure 5 is a plan view of the invention as adapted for supplying the water to several troughs and for heating the hog house, the latter being shown in dotted lines.

Figure 6 is an enlarged plan view of a portion of the system as shown in Figure 1 showing a means for returning the heated water direct to the supply tank without its entering the drinking trough.

Referring now more particularly to the drawings, the reference character A designates a hog house or other building of conventional form and B a water supply tank or stock watering tank situated in any desired position without the house A and supplied with water in the usual manner.

In carrying out the invention a conventional water heater 1 is seated somewhat below the level of the tank B as for instance in the pit 2 in the ground and the water from the tank B enters the inlet of this heater 1 through a heater inlet pipe 3 provided within the tank B with a conventional elongated wire mesh strainer 4. A conventional watering trough 5 is located in any suitable position within the building A. A trough supply pipe 6 is extended from the outlet of the heater 1, passes beneath the trough 5 to the far end thereof and then turns upon itself at 7 and extends back along the trough 5 and out of the building into the tank B where it is provided with a strainer 8 similar to the described strainer 4. This strainer 8 is disposed below the water level in the tank B but is above the strainer 4. The pipe 6 perferably, though not necessarily, has a slight upward slope from its beginning at the heater 1 to its end in the tank B, this to facilitate the circulation of the water as it is heated by said heater. Extended into the trough 5 is a branch pipe 9 communicating with the pipe 6 and provided at its free end with a conventional float operated valve 10.

From the foregoing it will be seen that the water will flow from the tank B into the heater 1 and be heated therein and will then flow through the pipe 6 back into the tank B. Water from the pipe 6 will flow into the trough 5 through the valve 10 and will be maintained at a constant level therein by the float on said valve. In this manner the stock will be provided with heated drinking water both in the trough 5 and tank B and since the pipe 6 carrying the heated water passes beneath the trough 5 it serves to further heat this trough.

Referring to Figure 6 two conventional three-way valves 11 and 12 are shown mounted in the two branches of the pipe 6 adjacent the point where said pipe is connected to the heater 1 and where it enters the tank B and a connecting pipe 13 connects the two valves. This arrangement allows the water when heated by the heater 1 to be diverted directly back to the tank B through the valves 11 and 12 and pipe 13 without entering the trough 5 when so desired.

Referring to Figure 5 the reference character C designates the hog house or building and D the water supply or stock watering tank. The heater 14 is similar to the described heater 1 and is situated below the tank D and connected thereto by the heater inlet pipe 15 provided with a strainer 16 within the tank. A plurality of troughs 17 are mounted around the walls of the building C or arranged in any other desired manner therein. A pipe 18 is connected to the outlet of the heater 14 and makes a circuit of the walls of the building C and then is extended into the tank D and provided with a strainer 19. Branch pipes 20 extend from the pipe 18 into each of the troughs 17 and float operated valves 21 similar to the described valves 10 are provided on the ends of these pipes 20 to supply the troughs with water as hereinbefore described. The system as illustrated in Figure 5 aside from heating the drinking water serves also to heat the building C. Three-way valves and a connecting pipe therebetween (not shown) similar to the hereinbefore described valves 11 and 12 and pipe 13 may be arranged in the pipe 18 to divert the heated water back to the tank D when so desired. Obviously any number of troughs 17 may be arranged around the building and provided with heated water from the pipe 18.

When it is not necessary to supply the troughs with heated water the water in the supply tank may be allowed to drop below the level of the outlet of the heating system or trough supply pipes thus shutting off the circulation of water but at the same time maintaining a constant level of water in the troughs as will be understood. It will be obvious that the supply tank, heater and troughs may be arranged in various ways according to the exigencies of each installation without interfering with the operation of the system as a whole. Also it is understood that a water circulating pump may be installed where its use is found necessary to circulate the water through the system.

While I have herein set forth certain preferred embodiments of my invention it is understood that I may vary from the same in minor structural details, not departing from the spirit of the invention and within the scope of the appended claims.

I claim:

1. In combination with a water supply tank and drinking troughs, a water heating and circulating system comprising a water heater, a pipe connecting the inlet of the heater and water supply tank, a pipe connecting the outlet of the water heater and the water supply tank, pipes connected to the last mentioned pipe and entering the said drinking troughs and a float operated valve on the pipe entering the trough.

2. In combination with a water supply tank and drinking troughs, a water heating and circulating system comprising a water heater, a pipe connecting the inlet of the heater and water supply tank, a pipe connecting the outlet of the water heater and the water supply tank, pipes connected to the last mentioned pipe and entering the said drinking troughs and float operated valves on the said pipes entering the troughs, and means connecting the outlet of the water heater and the water supply tank to divert the water directly back into the supply tank.

3. In combination with a water supply tank and drinking trough, a water heating and circulating system comprising a water heater situated below the level of the water supply tank, a heater inlet pipe connecting the inlet of the said water heater and the water supply tank, a trough supply pipe connected to the outlet of the water heater and passing beneath the trough and then into the water supply tank above the heater inlet pipe and a float operated valve connected to the said drinking trough supply pipe to admit water to the trough.

In testimony whereof I affix my signature.

DE WITT E. TALLYN.